United States Patent
Treiber et al.

(10) Patent No.: US 6,654,649 B2
(45) Date of Patent: Nov. 25, 2003

(54) COMPUTER METHOD AND APPARATUS FOR OPTIMIZED CONTROLLER IN A NON-LINEAR PROCESS

(75) Inventors: Steven Treiber, Oakville (CA); Ronald McLeod, Oakville (CA); Alex Kalafatis, Toronto (CA); Sundaram Ramanathan, Lexington, MA (US); Simon Lingard, Lexington, MA (US); Chau-Chyun Chen, Lexington, MA (US)

(73) Assignee: Aspen Technology, Inc., Cambridge, MA (US)

( * ) Notice: Subject to any disclaimer, the term of this patent is extended or adjusted under 35 U.S.C. 154(b) by 547 days.

(21) Appl. No.: 09/730,466

(22) Filed: Dec. 5, 2000

(65) Prior Publication Data

US 2002/0103548 A1 Aug. 1, 2002

Related U.S. Application Data

(60) Provisional application No. 60/171,799, filed on Dec. 22, 1999.

(51) Int. Cl.[7] .............................................. G05B 13/02
(52) U.S. Cl. ......................................... 700/31; 700/44
(58) Field of Search ............................. 700/31, 30, 29, 700/37, 44, 45

(56) References Cited

U.S. PATENT DOCUMENTS

| | | | | |
|---|---|---|---|---|
| 3,767,900 A | * | 10/1973 | Chao et al. ..................... | 700/31 |
| 4,466,054 A | * | 8/1984 | Shigemasa et al. ........... | 700/42 |
| 4,646,226 A | * | 2/1987 | Moon ........................... | 700/71 |
| 5,159,547 A | * | 10/1992 | Chand ......................... | 700/37 |
| 5,166,873 A | * | 11/1992 | Takatsu et al. ................ | 700/31 |
| 5,260,865 A | | 11/1993 | Beauford et al. | |
| 5,283,729 A | * | 2/1994 | Lloyd ........................... | 700/37 |
| 5,347,447 A | * | 9/1994 | Kiji et al. ...................... | 700/32 |
| 5,394,322 A | * | 2/1995 | Hansen ......................... | 700/37 |
| 5,406,474 A | * | 4/1995 | Hansen ......................... | 700/37 |
| 5,691,896 A | * | 11/1997 | Zou et al. ...................... | 700/37 |
| 5,740,033 A | | 4/1998 | Wassick et al. | |
| 5,818,714 A | * | 10/1998 | Zou et al. ...................... | 700/37 |
| 5,825,645 A | * | 10/1998 | Konar et al. ................... | 700/28 |
| 5,847,952 A | * | 12/1998 | Samad ......................... | 700/48 |
| 5,877,954 A | * | 3/1999 | Klimasauskas et al. ....... | 700/29 |
| 5,933,345 A | | 8/1999 | Martin et al. | |
| 5,959,861 A | | 9/1999 | Kaneko et al. | |
| 6,330,484 B1 | * | 12/2001 | Qin ............................. | 700/50 |

FOREIGN PATENT DOCUMENTS

| | | |
|---|---|---|
| DE | 198 24 433 A1 | 5/1999 |
| WO | WO 97/12300 | 4/1997 |

OTHER PUBLICATIONS

Ogunnaike, B. and W.H. Ray, "Process Representation," in *process dynamics, modeling, and control*, (NY: Oxford University Press) 1994 (pp. 1000–1007).

* cited by examiner

*Primary Examiner*—Ramesh Patel
*Assistant Examiner*—Edward F Gain
(74) *Attorney, Agent, or Firm*—Hamilton, Brook, Smith & Reynolds, P.C.

(57) ABSTRACT

A first principles, steady state model of a desired polymer process is applied with a non-linear optimizer to a linear controller. Model process gains and optimal target values for controller variables result. These results are utilized by a multivariable linear controller to achieve nonlinear control of the subject process. Preferably the nonlinear optimizer is DMO/SQP. The steady state model is produced by Polymers Plus and the linear controller is DMCplus, all of Aspen Technology, Inc. in Cambridge Mass.

14 Claims, 3 Drawing Sheets

COMPUTER METHOD AND APPARATUS FOR OPTIMIZED CONTROLLER IN A NON-LINEAR PROCESS

RELATED APPLICATION

This application claims the benefit of Provisional Patent Application No. 60/171,799, filed Dec. 22, 1999, the entire teachings of which are incorporated herein by reference.

BACKGROUND OF THE INVENTION

The polymer process is a complex nonlinear process. There are, therefore, many types of processes developed by different manufacturers. The differences within a single product type, such as polyethylene, include process configuration (e.g. tubular reactors, stirred tank reactors, loop reactors), reaction medium (e.g. gas phase, slurry, solution), catalyst types (Ziegler-Natta, peroxide, chromium, vanadium, and metallocene), reaction pressure and reaction temperature. As a consequence, these polymer processes exhibit significantly different nonlinear effects upon product properties.

For most polymer processes, the operating characteristics involve making one type of product for a period of time to satisfy a product order and then changing operating conditions to make another product type for a new demand. Typically, product types are characterized by bulk properties such as Melt Index and Density, which indicate how the product will behave when it is moulded or blown into a film. There are many other variations of these measurements, as well as other visual and performance properties, such as color and fish eyes, that are much more difficult to predict and control. These differences in design and characterization vary even more across products such as polypropylene, polystyrene, polycarbonates, nylon, etc.

Historically, it has been a challenge to control industrial polymer processes. Currently, the standard practice is to use neural network regression to identify process gains needed to adapt a multivariable linear controller in order to achieve a kind of nonlinear control. Aspen IQ™ and DMCplus™ (both by Aspen Technology, Inc. of Cambridge, Mass.) are examples of such a neural network program and linear process controller, respectively. The DMCplus linear models are based on linearized models around the nominal operating point. The current model gains are used by DMCplus for calculation of the gain multipliers. However, this approach has proven to be time consuming, manpower intensive and costly.

SUMMARY OF THE INVENTION

The present invention provides a solution to the foregoing problems in process control in the prior art. In particular, the present invention provides a computer method and apparatus which enables a multivariable, process controller to achieve non-linear control. In a preferred embodiment, the present invention utilizes the rigorous, non-linear model of the process at steady state as generated by Polymer Plus® (a software product by Aspen Technology, Inc. of Cambridge, Mass.) to optimize the controller.

Hence, in accordance with one aspect of the present invention, a nonlinear optimizer solves a first principles, steady state process model and calculates process gains and optimal targets for the multivariable controller. The first principles, rigorous, mechanistic Polymers Plus models handle the issue of process non-linearity derived from kinetics, thermodynamics and process configuration. These models are valid across a wide operating range, extrapolate well, capture the process non-linearity and require only minimal amounts of process data. Based on this approach, the current process gains for each Independent/Dependent model can be easily obtained from the partial derivatives of the corresponding first principles Polymers Plus model.

In the preferred embodiment, the optimizer calculates the optimal targets for the Manipulated Variables (MVs) and Controlled Variables (CVs) of the DMCplus controller, replacing the internal Linear Program (LP) optimizer that is, based on the current process gains. This way, the DMCplus controller follows a consistent set of targets and does not change its direction due to process gain changes. It is noted that the DMCplus controller still uses the current model gains (based on the current gain multipliers) to calculate the control-move plan so that controller stability is preserved.

To that end, computer apparatus embodying the present invention comprises (a) a controller for determining and adjusting manipulated variable values for controlling a subject non-linear manufacturing process, and (b) an optimizer coupled to the controller for updating the linear model of the controller. The controller employs a dynamic linear model for modeling the effect that would result in the subject manufacturing process with a step change in manipulated variable values. As the subject non-linear manufacturing process transitions from one operating point to another, in a high degree of non-linearity between manipulated variables and controlled variables of the subject process, the optimizer updates the linear models of the controller. The optimizer utilizes a non-linear model of the subject process for determining target values of the controlled variables. The controlled variables are indicative of physical properties of the subject process.

In accordance with another aspect of the present invention, there is a source of sensor measured variables for representing the measurable physical properties and hence controlled variables of the subject process. The non-linear model of the optimizer determines gains between the manipulated variables and the sensor measured controlled variables. As such, the optimizer gain adapts the linear model of the controller with the determined gains.

In accordance with another aspect of the invention, the non-linear model of the optimizer is a rigorous, first principles, non-linear model. Further, the optimizer and its non-linear model is executed as frequently as the controller.

The present invention method for controlling a non-linear manufacturing (e.g., polymer) process thus includes the computer-implemented steps of:
  (i) utilizing a linear model, modeling effect that would result in a subject manufacturing process with a step change in manipulated variable values used for controlling said process;
  (ii) using a non-linear model of the subject process, determining target values of the controlled variables indicative of physical properties of the subject process; and
  (iii) updating the linear model as the subject process transitions; from one operating point to another, in a high degree of non-linearity between the manipulated variables and controlled variables of the subject process.

In particular, the invention method uses the non-linear model of the subject process to update the process gains (between the manipulated variables and the controlled variables) for the linear model.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
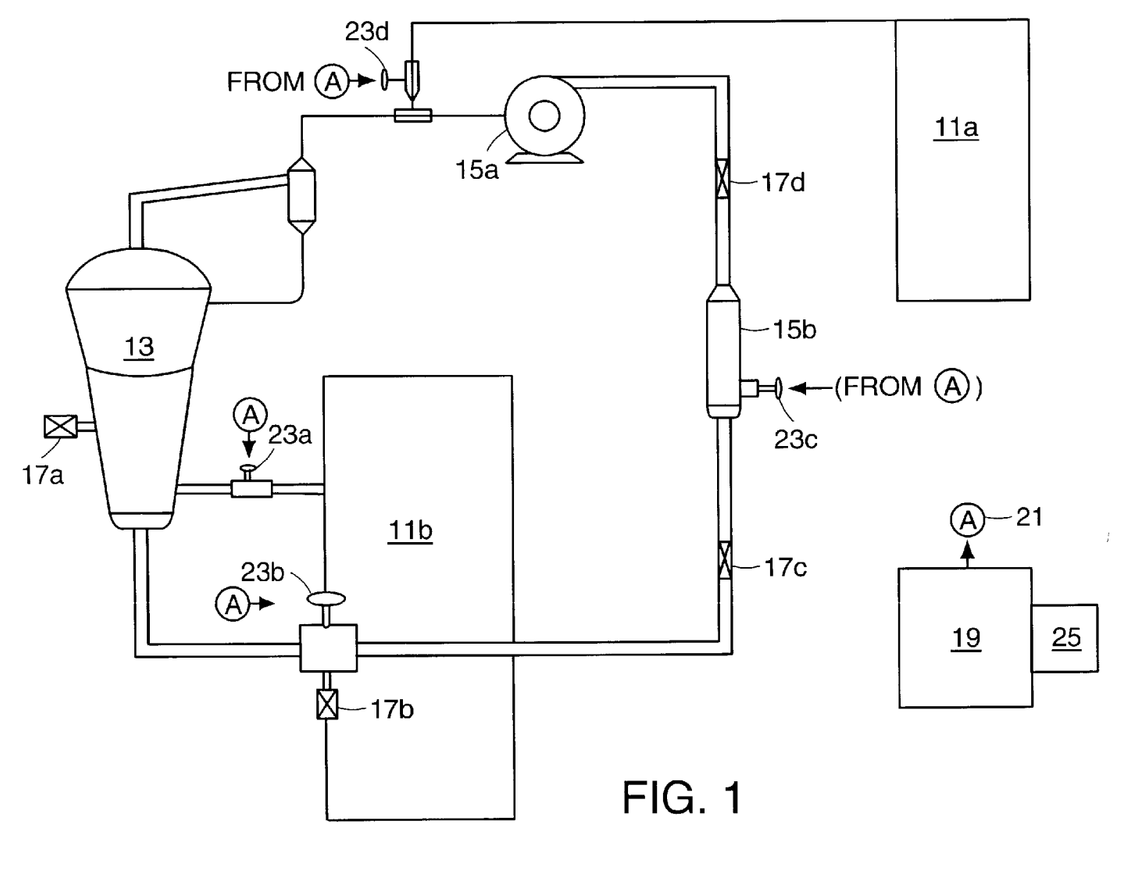
FIG. 1 is a schematic drawing of a manufacturing process with an optimized controller of the present invention.

Illustrated in FIG. 1 is a manufacturing plant for carrying out a non-linear process such as a chemical or polymer process. The processing plant is formed of a series of vessels (e.g., holding tanks, feed tanks, catalyst feeds), reactors (including mixing tanks, etc.) and pumps (or compressors) connected by various conduits and pipes. Sensors 17 senses temperature, volume, pressure, compositions and other physical properties at various points in the process and provide sensor data to a software or computer-implemented controller 19. The controller 19 utilizes the sensor data to maintain setting for controlled variables such as temperature, pressure, compositions and product properties by adjusting manipulated variables such as feed rates, flowrate, temperature of the vessels, reactor 13 and pumps/compressors 15. Controller 19 physically effects adjustment of the manipulated variables through actuators 21 coupled to respective valves 23 of the vessels 11, reactors 13 and pumps/compressors 15.

In particular, the controller 19 employs a linear dynamic model of the manufacturing process. These linear models relate the dynamic responses of controlled variables to manipulated variables in terms of process gains, response time, and dead time. The sensor data define values of control variables in the model equations. The model predicts how controlled variables will change with respect to step changes in manipulated variables.

An optimizer 25 uses the sensor data and an internal model of the manufacturing process to provide target values for the controlled variables. In the preferred embodiment, commonly known first principles equations for thermodynamics, kinetics, and heat and mass balances define the model. As a result, the model is capable of predicting the nonlinear relationship (or gains) between the controlled variables and the manipulated variables based on first principles.

In the case of a highly non-linear process being controlled, the linear model of the controller 19 is problematic. A common practice in the prior art is to update the process gains of the linear model in a pre-programmed manner based on process experiences. Applicants have discovered an improved non-linear optimizer 25 for such a controller 19. Specifically, the optimizer 25 of the present invention employs a non-linear first principles model which is suitable for frequently calculating target controlled variable values and non-linear gains between the controlled variables and manipulated variables. Frequency of optimizer 25 calculations and operation is about every 2–3 minutes or about the same rate as the controller 19 determinations are made. The non-linear gains computed by the optimizer 25 are used continuously to update the process gains of the linear model of the controller 19. In contrast, typical optimizers used with process control of the prior art perform calculations only for target control variables at about once every four hours or so and hence not at a rate helpful to the controller 19 of a highly non-linear process.

Figure 2:
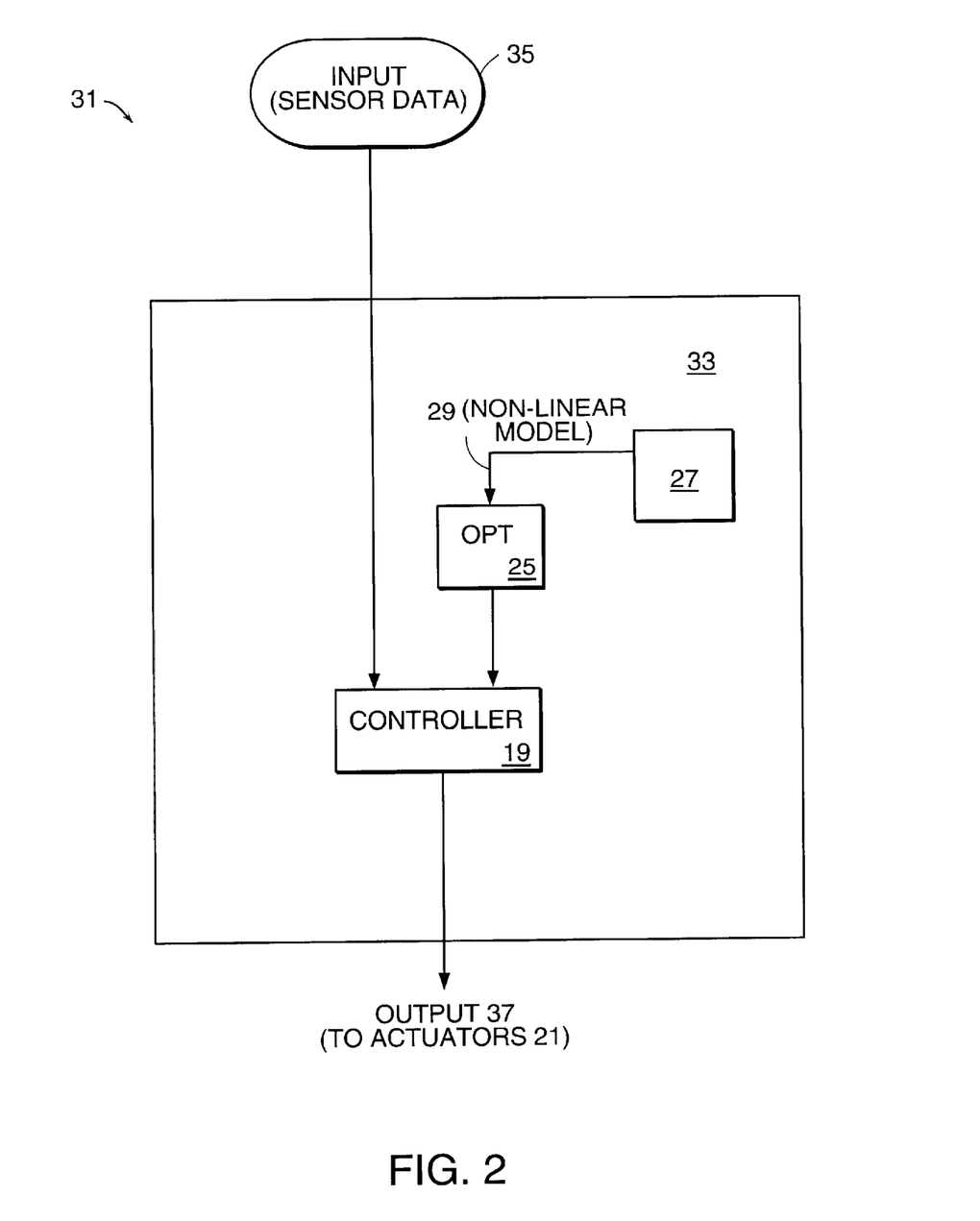
FIG. 2 is a block diagram of the controller of FIG. 1 as implemented in a computer system.

Referring now to FIG. 2 is an illustration of the preferred embodiment in a computer system 31. Generally, the computer system 31 includes a digital processor 33 which hosts and executes the invention controller 19 and optimizer 25 in working memory. Input 35 to digital processor 33 is from sensors 17, another software program, another computer, input devices (e.g., keyboard, mouse, etc.) and the like. Output 37 (i.e., the controlled variable settings determined by controller 19 and gain adapted by optimizer 25) is provided to actuators 21, another computer, storage memory, another software program and/or output devices (e.g., display monitor, etc.) and the like. It is understood that computer system 31 may be linked by appropriate communication links to a local area network, external network (i.e., the Internet) or similar such networks for sharing or distributing input and output data.

In FIG. 2, the controller 19 is preferably DMC Plus by Aspen Technology, Inc. of Cambridge, Mass. Optimizer 25 is preferably DMO/SQP®) also of Aspen Technology, Inc. Other similar non-linear optimizers are suitable. In the preferred embodiment, Polymers Plus (module 27 in FIG. 2) of Aspen Technology Inc. supplies the internal rigorous, non-linear model 29 to optimizer 25. That is, optimizer 25 uses a steady state process model 29 based on first principles, rigorous, mechanistic Polymers Plus models.

By way of the below example, the preferred embodiment is illustrated around a fluidized bed, gas phase polyethylene process. The non-linear optimizer 25 solves the non-linear steady state model 29 from Polymer Plus module 27. To accomplish this, the optimizer 25 employs a:

Sparsity file,

Nonlinear steady state model 29, and

Objective function

The non-linear model 29 is, preferably, formulated in open-equation form. In this case, optimizer 25 supplies values to the model 29 for all the variables of interest, including manipulated variables and controlled variables. The model 29 returns to optimizer 25 the values of the constraint equation residuals, and as many of the Jacobian elements (partial derivatives) as it can calculate.

If an open-equation model is not available, a closed-form model may also be used. In that case, optimizer 25 supplies values to the model 29 for its 'input' variables, and the model 29 returns values of its 'output' variables.

The nonlinear model 29 user interface package allows users to:

Set a scenario—initial values of controlled variables and manipulated variables

Set constraints—targets or upper and lower limits on controlled variables and manipulated variables Set the objective function—costs on controlled variables and manipulated variables Run a simulation of the scenario View the calculated trajectory of the controlled variable targets and manipulated variable targets over the nonlinear simulation interval.

As such, Optimizer 25 (via the nonlinear model 29) supplies the following to the DMCplus controller 19:

Controlled variable targets or upper and lower limits

Manipulated variable targets

Model gains (i.e. derivatives of controlled variables with respect to manipulated variables, derivatives of controlled variables with respect to Feed Forward variables) for the current operating point Other model variables (such as residence time)

Example Reactor Model

Figure 3:
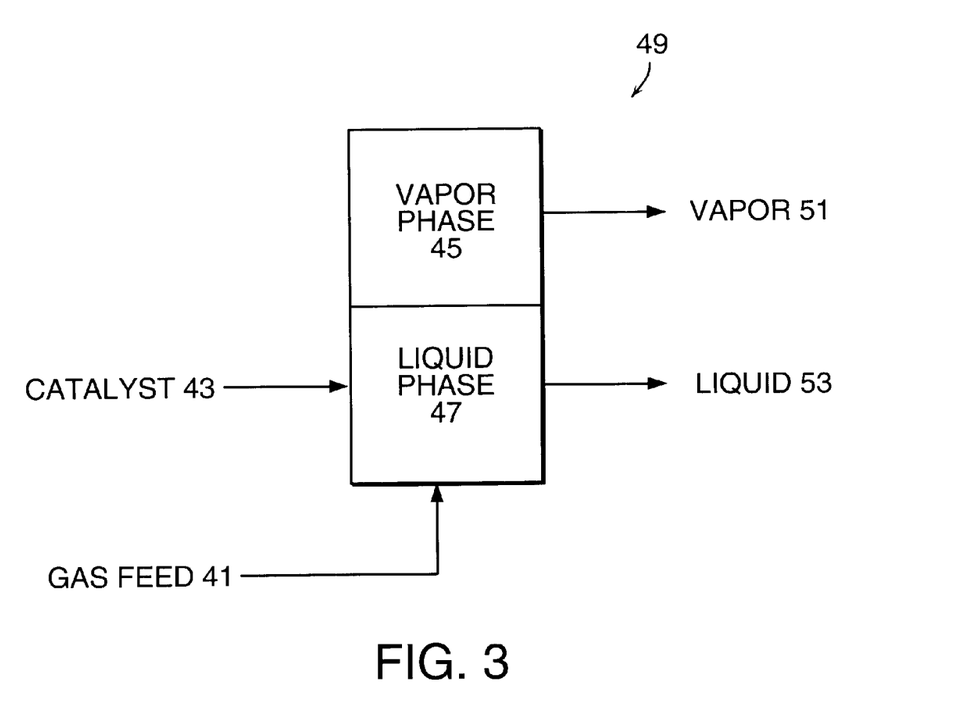
FIG. 3 is a block schematic of a reactor model employed in the optimizer to the controller of FIG. 2.

The nonlinear model 29 incorporates all of the equipment of interest required to represent the polyethylene process—the reactor, heat exchanger, compressor, mixers, splitters, component separator, valves, etc. Details of the reactor model 49 are given below for illustrative purposes.

As shown in FIG. 3, the reactor 49 is modeled as a steady-state CSTR (continuous stir tank reactor), with a vapor phase 45 and a liquid phase 47 in equilibrium. Two feeds—a gas feed 41 and a catalyst feed 43—are required. The two products are (1) a vapor stream 51, and (2) a liquid stream 53 containing the polymer.

The reactor model 49 is composed of the following nonlinear equations derived from first principles of the Polymers Plus module 27:

Component material balances
Total material balance
Pressure balances
Energy balance
Vapor enthalpy calculation
Liquid enthalpy calculation
Vapor-liquid equilibrium
Reactor volumes
Component reaction rates
Polymer attribute calculations
Catalyst attribute calculations The equations require calculations on the stream enthalpy, stream density, reaction kinetics, vapor-liquid equilibrium K-values, and the polymerization reaction kinetics. Such calculations are performed by subroutines in Polymers Plus module 27.

Component Slate

The component slate for the reactor model 49 consists of

| | |
|---|---|
| Cat | Catalyst |
| Cocat | Cocatalyst |
| C2 | Ethylene |
| C4 | Butene |
| H2 | Hydrogen |
| HDPE | Polymer |

Variables

Streams into and out of the reactor model 49 have a standard format and units of measurement to enable automatic connection to other equipment models. Conversion to internal model units of measurement takes place inside the model 49. The stream variables are:

Gas feed (41):

| | | |
|---|---|---|
| $F_{gas}$ | Gas feed flow | Klbmol/hr |
| $Z_1$ | Gas feed component mole fractions | mole fraction |
| $T_{gas}$ | Gas feed temperature | deg F |
| $P_{gas}$ | Gas feed pressure | PSIG |
| $H_{gas}$ | Gas feed enthalpy | KBTU/lbmol |

Catalyst Feed (43):

| | | |
|---|---|---|
| $F_{cat}$ | Catalyst flow | Klbmol/hr |
| $W_1$ | Catalyst component mole fractions | mole fraction |
| $T_{cat}$ | Catalyst temperature | deg F |
| $P_{cat}$ | Catalyst pressure | PSIG |
| $H_{cat}$ | Catalyst enthalpy | KBTU/lbmol |

Vapor Product (51):

| | | |
|---|---|---|
| $F_V$ | Vapor flow | Klbmol/hr |
| $y_i$ | Vapor component mole fractions | mole fraction |
| $T_V$ | Vapor temperature | deg F |
| $P_V$ | Vapor pressure | PSIG |
| $H_V$ | Vapor enthalpy | KBTU/lbmol |

Liquid Product (53):

| | | |
|---|---|---|
| $F_L$ | Liquid flow | Klbmol/hr |
| $x_i$ | Liquid component mole fractions | mole fraction |
| $T_L$ | Liquid temperature | deg F |
| $P_L$ | Liquid pressure | PSIG |
| $H_L$ | Liquid enthalpy | KBTU/lbmol |

Reactor Model 49 variables:

| | | |
|---|---|---|
| Q | Heat added to reactor | MBTU/hr |
| Level | Liquid level in reactor | meters |
| $V_L$ | Volume of liquid | cubic meters |
| $V_V$ | Volume of vapor | cubic meters |
| $Rho_L$ | Liquid density | kgmol/cum |
| $Rho_V$ | Vapor density | kgmol/cum |
| $ResTime_L$ | Liquid residence time | hours |
| $ResTime_V$ | Vapor residence time | hours |
| $Pol_{out}$ | Polymer flow out | kg/sec |
| $R_1$ | Component reaction rate (-ve = consumption) | kgmol/cum-sec |
| $R_{SZMoM}$ | Reaction rate for zeroth moment of bulk polymer | kgmol/cum-sec |
| $R_{SSFLOWseg}$ | Reaction rate for first moment of bulk polymer | kgmol/cum-sec |
| $R_{SSMOM}$ | Reaction rate for second moment of bulk polymer | kgmol/cum-sec |
| $R_{LSEFLOWseg}$ | Reaction rate for zeroth moment of live polymer | kgmol/cum-sec |
| $R_{LSSFLOWseg}$ | Reaction rate for first moment of live polymer | kgmol/cum-sec |

-continued

| | | |
|---|---|---|
| SZMOM | Zeroth moment of bulk polymer | gmol/kg polymer |
| SSFLOW$_{seg}$ | First moment of bulk polymer, per segment | gmol/kg polymer |
| SSMOM | Second moment of bulk polymer | kgmol/kg polymer |
| LSEFLOW$_{seg}$ | Zeroth moment of live polymer, per segment | milli-gmol/kg polymer |
| LSSFLOW$_{seg}$ | First moment of live polymer, per segment | milli-gmol/kg polymer |
| R$_{CPS}$ | Reaction rate for catalyst potential sites | kgmol/cum-sec |
| R$_{CVS}$ | Reaction rate for catalyst vacant sites | kgmol/cum-sec |
| R$_{CDS}$ | Reaction rate for catalyst dead sites | kgmol/cum-sec |
| Cat$_{out}$ | Catalyst flow out | kg/sec |
| CPS$_{in}$ | Catalyst potential site concentration-catalyst feed | milli-gmol/kg catalyst |
| CVS$_{in}$ | Catalyst vacant site concentration-catalyst feed | milli-gmol/kg catalyst |
| CDS$_{in}$ | Catalyst dead site concentration-catalyst feed | milli-gmol/kg catalyst |
| CPSFLOW | Catalyst potential site concentration-liquid product | milli-gmol/kg catalyst |
| CVSFLOW | Catalyst vacant site concentration-liquid product | milli-gmol/kg catalyst |
| CDSFLOW | Catalyst dead site concentration-liquid product | milli-gmol/kg catalyst |
| MWW | Weight-average degree of polymerization | |
| MWN | Number average degree of polymerization | |
| MI | Polymer melt index | |
| MIBias | Melt index offset from measured | |
| Frac | Fraction comonomer in polymer | mole fraction |
| Dens | Polymer density | |
| Dbias | Polymer density offset from measured | |

Internal variables

| | | |
|---|---|---|
| K$_I$ | Component K-value | |
| MW$_1$ | Component molecular weight | g/gmol |

Parameters

The following variables have fixed values

| | | |
|---|---|---|
| V | Reactor volume | cubic meters |
| Area | Reactor cross-section area, liquid section | square meters |
| A, B, C, D | Constants in melt index equation | |
| E, F, G | Constants in polymer density equation | |
| E3 | 1000.0 | |
| E6 | 1.0E+06 | |

Inputs to subroutine ZNMECH:

| | | | |
|---|---|---|---|
| NSITES | Total number of site types | 1 | |
| NCAT | Number of catalysts | 1 | |
| NCCAT | Number of cocatalysts | 1 | |
| NMOM | Number of monomers | 2 | |
| NSEG | Number of segments | 2 | |
| NPOL | Number of polymers | 1 | |
| AKO(nrx) | Pre-exponential factors | | |
| EACT(nrx) | Activation energies | | |
| ORD(nrx) | Reaction order | | |
| TREF(nrx) | Reference temperature | 1.0E+35 | |
| Conc(ncpt) | component concentrations | = $x_i \cdot Rho_L$ | kgmol/cum |
| CPS | catalyst site concentration | = $CPSFLOW \cdot Rho_L \cdot x_{cat} \cdot MW_{cat}/E6$ | kgmol/cum |
| CVS | catalyst site concentration | = $CVSFLOW \cdot Rho_L \cdot x_{cat} \cdot MW_{cat}/E6$ | kgmol.cum |
| Mu0(seg) | live moment concentration | = $LSEFLOW_{seg} \cdot Rho_L \cdot x_{pol} \cdot MW_{pol}/E6$ | kgmol/cum |
| Mu1(seg) | live moment concentration | = $LSSFLOW_{seg} \cdot Rho_L \cdot x_{pol} \cdot MW_{pol}/E6$ | kgmol/cum |
| Lam0 | dead moment concentration | = $SZMOM \cdot Rho_L \cdot x_{pol} \cdot MW_{pol}/E3$ | kgmol/cum |
| Lam1(seg) | dead moment concentration | = $SSFLOW_{seg} \cdot Rho_L \cdot x_{pol} \cdot MW_{pol}/E3$ | kgmol/cum |
| Lam2 | dead moment concentration | = $SSMOM \cdot Rho_L \cdot x_{pol} \cdot MW_{pol}$ | kgmol/cum |

Conversion factors:

| | | |
|---|---|---|
| Kg2Lb | Convert kilograms to pounds | 2.2046 |
| Sec2Hr | Convert seconds to hours | 3600.0 |

Subroutines (of Polymers Plus module 27)

| | |
|---|---|
| DENSITY | Stream density |
| ENTHLP | Stream enthalpy |
| KVALUE | Vapor-liquid equilibrium Kvalues |
| ZNMECH | Component reaction rates, catalyst attributes, and polymer attributes |

Equations (solved by the non-linear model 29)

Component material balances:

Catalyst:

$$F_{cat} \cdot w_i - F_L \cdot x_i + Sec2Hr \cdot Kg2Lb \cdot R_i \cdot V_L/E3 = 0 \qquad \text{Klbmol/hr} \qquad (1)$$

Cocatalyst:

$$F_{cat} \cdot w_i - F_L \cdot x_i + Sec2Hr \cdot Kg2Lb \cdot R_i \cdot V_L/E3 = 0 \qquad \text{Klbmol/hr} \qquad (2)$$

Ethylene:

$$F_{gas} \cdot z_1 - F_v \cdot y_1 - F_L \cdot x_i + Sec2Hr \cdot Kg2Lb \cdot R_i \cdot V_L E3 = 0 \qquad \text{Klbmol/hr} \qquad (3)$$

-continued

Butene:

$$F_{gas}\cdot z_l - F_v\cdot y_l - F_L\cdot x_l + Sec2Hr\cdot Kg2Lb\cdot R_l\cdot V_L E3 = 0 \quad \text{Klbmol/hr} \quad (4)$$

Hydrogen:

$$F_{gas}\cdot z_l - F_v\cdot y_l - F_L\cdot x_l + Sec2Hr\cdot Kg2Lb\cdot R_l\cdot V_L E3 = 0 \quad \text{Klbmol/hr} \quad (5)$$

Polymer:

$$- F_L x_l + Sec2Hr\cdot Kg2Lb\cdot R_l\cdot V_L E3 = 0 \quad \text{Klbmol/hr} \quad (6)$$

Total material balance:

$$F_{gas} + F_{cat} - F_L + Sec2Hr\cdot Kg2Lb\cdot \Sigma R_l\cdot V_L E3 = 0 \quad \text{Klbmol/hr} \quad (7)$$

Temperature balance:

$$T_V - T_L = 0 \quad \text{deg F} \quad (8)$$

Pressure balances:

$$P_{cat} - P_{gas} = 0 \quad \text{PSIG} \quad (9)$$
$$P_V - P_{gas} = 0 \quad \text{PSIG} \quad (10)$$
$$P_L - P_{gas} = 0 \quad \text{PSIG} \quad (11)$$

Energy balance:

$$F_{gas}\cdot H_{gas} + F_{cat}\cdot H_{cat} - F_V\cdot H_V - F_L\cdot H_L + Q = 0 \quad \text{MBTU/hr} \quad (12)$$

Vapor enthalpy calculation:

$$H_V - \text{Enthlp}(\text{'V'}, y_i, T_V, P_V) = 0 \quad \text{KBTU/lbmol} \quad (13)$$

Liquid enthalpy calculation:

$$H_L - \text{Enthlp}(\text{'L'}, x_l, T_L, P_L) = 0 \quad \text{KBTU/lbmol} \quad (14)$$

Vapor-liquid equilibrium:

Ethylene, Butene, Hydrogen:

$$y_l - K_l\cdot x_l = 0 \quad \text{mole fraction} \quad (15\text{--}17)$$

Flash equation $$\Sigma y_l - \Sigma x_l = 0 \quad (18)$$

Kvalue calculation $$K_l - K_{value}(x_i, y_l, T_L, P_L) = 0$$

Reactor volumes:

Liquid volume:

$$V_L - \text{Level}\cdot\text{Area} = 0 \quad \text{cubic meters} \quad (19)$$

Liquid density:

$$Rho_L - \text{Density}(\text{'L'}, x_l, T_L, P_L) = 0 \quad \text{kgmol/cum} \quad (20)$$

Liquid residence time:

$$ResTime_L - V_L\cdot Rho_L\cdot Kg2Lb/F_L = 0 \quad \text{hours} \quad (21)$$

Vapor volume:

$$V - V_L - V_V = 0 \quad \text{cubic meters} \quad (22)$$

Vapor density:

$$Rho_V - \text{Density}(\text{'V'}, y_l, T_V, P_V) = 0 \quad \text{kgmol/cum} \quad (23)$$

Vapor residence time:

$$ResTime_V - V_V\cdot Rho_V\cdot Kg2Lb/F_V = 0 \quad \text{hours} \quad (24)$$

Component reaction rates:

$$R_l - \text{ZNMECH}(T_L, P_L, x_l, MW_l, Mu_l, Lam_l, CPS, CVS, CIS) = 0 \quad \text{kgmol/cum-sec} \quad (25\text{--}30)$$

Polymer attributes:

Attribute rates:

$$R_{SZMOM} - \text{ZNMECH}(T_L, P_L, x_l, MW_i, Mu_l, Lam_l, CPS, CVS, CIS) = 0 \quad \text{kgmol/cum-sec} \quad (31)$$
$$R_{SSFLOWseg} - \text{ZNMECH}(T_L, P_L, x_l, MW_i, Mu_l, Lam_l, CPS, CVS, CIS) = 0 \quad \text{kgmol/cum-sec} \quad (32\text{--}33)$$
$$R_{SSMOM} - \text{ZNMECH}(T_L, P_L, x_l, MW_i, Mu_l, Lam_l, CPS, CVS, CIS) = 0 \quad \text{kgmol/cum-sec} \quad (34)$$
$$R_{LSEFLOWseg} - \text{ZNMECH}(T_L, P_L, x_l, MW_i, Mu_l, Lam_l, CPS, CVS, CIS) = 0 \quad \text{kgmol/cum-sec} \quad (35\text{--}36)$$
$$R_{LSSFLOWseg} - \text{ZNMECH}(T_L, P_L, x_l, MW_i, Mu_l, Lam_l, CPS, CVS, CIS) = 0 \quad \text{kgmol/cum-sec} \quad (37\text{--}38)$$

Polymer flow out $$Pol_{out} - F_L\cdot x_{pol}\cdot MW_{pol}\cdot E3/Sec2Hr\cdot Kg2Lb = 0 \quad \text{kg/sec} \quad (39)$$

Zeroth moment of bulk polymer, per site (1 site)

$$SZMOM\cdot Pol_{out}/E3 - R_{SZMOM}\cdot V_L = 0 \quad \text{kgmol/sec} \quad (40)$$

-continued

| | | |
|---|---|---|
| First moment of bulk polymer, per segment (2 segments), per site (1 site) | | |
| $SSFLOW_{seg}.Pol_{out}/E3 - R_{SSFLOWseg}.V_L = 0$ | kgmol/sec | (41, 42) |
| Second moment of bulk polymer, per site (1 site) | | |
| $SSMOM.Pol_{out}/E3 - R_{SSMOM}.V_L = 0$ | kgmol/sec | (43) |
| Zeroth moment of live polymer, per segment (2 segments), per site (1 site) | | |
| $LSEFLOW_{seg}.Pol_{out}/E6 - R_{LSEFLOWseg}.V_L = 0$ | kgmol/sec | (44, 45) |
| First moment of live polymer, per segment (2 segments), per site (1 site) | | |
| $LSSFLOW_{seg}.Pol_{out}/E6 - R_{LSSFLOWseg}.V_L = 0$ | kgmol/sec | (46, 47) |
| Melt index | | |
| $MWW - SSMOM/\Sigma SSFLOW_{seg} = 0$ | weight-average | (48) |
| $MWN - \Sigma SSFLOW_{seg}/SZMOM = 0$ | number-average | (49) |
| $MI - A.MWW^B - C.MWN^D + MIBias = 0$ | | (50) |
| Density | | |
| $Frac - SSFLOW_{C4}/\Sigma SSFLOW_{seg} = 0$ | mol fraction | (51) |
| $Dens - E + F.Frac^G + Dbias = 0$ | | (52) |
| Catalyst attributes: | | |
| Attribute rates | | |
| $R_{CPS} - ZNMBCH(T_L, P_L, x_l, MW_l, Mu_l, Lam_l, CPS, CVS, CIS) = 0$ | kgmol/cum-sec | (53) |
| $R_{CVS} - ZNMECH(T_L, P_L, x_l, MW_l, Mu_l, Lam_l, CPS, CVS, CIS) = 0$ | kgmol/cum-sec | (54) |
| $R_{CDS} - ZNMECH(T_L, P_L, x_i, MW_i, Mu_l, Lam_l, CPS, CVS, CIS) = 0$ | kgmol/cum-sec | (55) |
| Catalyst flow out | | |
| $Cat_{out} - F_L.x_{cat}.MW_{cat}.E3/Sec2Hr.Kg2Lb = 0$ | kg/sec | (56) |
| Potential sites, per catalyst (1 catalyst) | | |
| $CPSFLOW.Cat_{out}/E6 - CPS_{in}.F_{cat}.w_{cat}.MW_{cat}/Sec2Hr.Kg2Lb.E3 - R_{CPS}.V_L = 0$ | kgmol/sec | (57) |
| Vacant sites, per site (1 site) | | |
| $CVSFLOW.Cat_{out}/E6 - CVS_{in}.F_{cat}.w_{cat}.MW_{cat}/Sec2Hr.Kg2Lb.E3 - R_{CVS}.V_L = 0$ | kgmol/sec | (58) |
| Dead sites | | |
| $CDSFLOW.Cat_{out}/E6 - CDS_{in}.F_{cat}.w_{cat}.MW_{cat}/Sec2Hr.Kg2Lb.E3 - R_{CDS}.V_L = 0$ | kgmol/sec | (59) |

Analysis

Fixed variables are those having values specified to define the problem. The number of equations must equal the number of calculated variables.

Number of Variables

| Description | Number | Fixed | Calculated |
|---|---|---|---|
| Gas feed - 3 components, F, T, P, H | 7 | 6 | 1 (P) |
| Catalyst feed - 2 components, F, T, P, H | 6 | 5 | 1 (P) |
| Vapor product - 3 components, F, T, P, H | 7 | 1 (P) | 6 |
| Liquid product - 6 components, F, T, P, H | 10 | 1 (T) | 9 |
| Heat added, Q | 1 | 0 | 1 |
| Liquid Volume, Level, Residence time | 7 | 1 | 6 |
| Component reaction rates | 6 | 0 | 6 |
| Polymer attributes, rates | 17 | 0 | 17 |
| Melt index | 4 | 1 | 3 |
| Density | 3 | 1 | 2 |
| Catalyst attributes, rates | 10 | 3 | 7 |
| Total | 78 | 19 | 59 |

Number of Variables

| Description | Number |
|---|---|
| Component material balances | 6 |
| Total material balance | 1 |
| Temperature balance | 1 |
| Pressure balances | 3 |
| Energy balance, product enthalpies | 3 |
| Vapor-liquid equilibrium, 3 components + flash | 4 |
| Reactor volume, Residence time | 6 |
| Component reaction rates | 6 |
| Polymer attributes, rates | 17 |
| Melt index | 3 |
| Density | 2 |
| Catalyst attributes, rates | 7 |
| Total | 59 |

In the preferred embodiment, the reactor model 49 is formulated to fit into pre-defined stream conventions:

Mole fractions must sum to 1.0

A stream contains mole fractions, flow, temperature, pressure, and enthalpy

In Polymers Plus (module 27) formulation, the following variables are included in the streams:

| Catalyst feed stream 43 | | |
| --- | --- | --- |
| $CPS_{in}$ catalyst | Catalyst potential site concentration - catalyst feed | milli-gmol/kg |
| $CVS_{in}$ catalyst | Catalyst vacant site concentration - catalyst feed | milli-gmol/kg |
| $CDS_{in}$ catalyst | Catalyst dead site concentration catalyst feed | milli-gmol/kg |
| Liquid product stream 53 | | |
| SZMOM polymer | Zeroth moment of bulk polymer | gmol/kg |
| $SSFLOW_{seg}$ polymer | First moment of bulk polymer, per segment | gmol/kg |
| SSMOM polymer | Second moment of bulk polymer | kgmol/kg |
| $LSEFLOW_{seg}$ polymer | Zeroth moment of live polymer, per segment | milli-gmol/kg |
| $LSSFLOW_{seg}$ polymer | First moment of live polymer, per segment | milli-gmol/kg |
| CPSFLOW catalyst | Catalyst potential site concentration - liquid product | milli-gmol/kg |
| CVSFLOW catalyst | Catalyst vacant site concentration liquid product | milli-gmol/kg |
| CDSFLOW catalyst | Catalyst dead site concentration liquid product | milli-gmol/kg |

The manipulated variables of the reactor 49 include the catalyst feed 43 variables and gas feed 44 variables as solved by subroutine ZNMECH. Thus, optimizer 25 forwards, in pertinent part, the output of subroutine ZNMECH to DMC-Plus controller 19. In response, DMCPlus controller 19 uses the subroutine outputs to update the process gains in its dynamic linear model of reactor 49.

The corresponding dynamic linear models of reactor 49 employed by the DMC controller 19 are of the form $$\beta \Delta u(k) = e(k+1)$$

where $\beta$ is the reactor's dynamic matrix having m columns of the reactor's step function appropriately shifted down in order. $\Delta u(k)$ is an m-dimensional vector of control moves. $e(k+1)$ is the projected error vector. See B. A. Ogunnaike and W. H. Ray, "Process dynamics, modeling, and control," Chapter 27, pp. 1000–100.7, Oxford University Press 1994.

According to the foregoing example and description, the present invention utilizes first principles kinetics, thermodynamics and heat and mass balances to develop the non-linear relationships between the manipulated variables and controlled variables. Based on these non-linear relationships (non-linear model 29), optimizer 25 effectively and timely gain adapts the dynamic linear model for use in controller 19 for the subject manufacturing process. As such, the preferred embodiment provides a novel combination of (i) Polymers Plus rigorous, non-linear models 19, (ii) a non-linear optimizer 25 and (iii) DMCPlus (or similar dynamic linear model based) controller 19 as heretofore unapplied to process control.

While this invention has been particularly shown and described with references to preferred embodiments thereof, it will be understood by those skilled in the art that various changes in form and details may be made therein without departing from the scope of the invention encompassed by the appended claims.

What is claimed is:

1. Computer apparatus for controlling a non-linear manufacturing process comprising:

a controller for determining and adjusting manipulated variable values for controlling a subject non-linear manufacturing process, the controller employing a linear model for modeling effect that would result in the subject manufacturing process with a step change in manipulated variable values; and an optimizer coupled to the controller for updating the linear model of the controller, as the subject non-linear manufacturing process transitions from one operating point to another, in a high degree of non-linearity between manipulated variables and controlled variables of the subject process, the controlled variables being indicative of physical properties of the subject process, the optimizer utilizing a non-linear model of the subject process for updating the linear model and determining target values of the controlled variables.

2. Computer apparatus as claimed in claim 1 wherein the controller employs dynamic linear models.

3. Computer apparatus as claimed in claim 1 further comprising a source of sensor measured variables for representing the controlled variables of the subject process.

4. Computer apparatus as claimed in claim 3 wherein the non-linear model of the optimizer determines gains between the manipulated variables and the sensor measured controlled variables, and the optimizer gain adapts the linear model of the controller with the determined gains.

5. Computer apparatus as claimed in claim 1 wherein the optimizer is executed as frequently as the controller.

6. Computer apparatus as claimed in claim 1 wherein the non-linear model of the optimizer is a rigorous, first principles, non-linear model.

7. Computer apparatus as claimed in claim 1 wherein the subject non-linear manufacturing process is a polymer process.

8. A method for controlling a non-linear manufacturing process comprising the computer implemented steps of:

utilizing a linear model, modeling effect that would result in a subject manufacturing process with a step change in manipulated variable values used for controlling said process;

using a non-linear model of the subject process, (i) updating the linear model as the subject process transitions from one operating point to another, in a high degree of non-linearity between the manipulated variables and controlled variables indicative of physical properties of the subject process, and (ii) determining target values of the controlled variables.

9. A method as claimed in claim 8 wherein the step of utilizing a linear model includes dynamic linear models.

10. A method as claimed in claim 8 further comprising the step of providing sensor measured variables for representing various controlled variables of the subject process.

11. A method as claimed in claim 10 further comprising the step of determining process gains between the manipulated variables and the sensor-measured controlled variables using the non-linear model; and the step of updating the linear model includes gain adapting the linear model with the determined gains.

12. A method as claimed in claim 8 wherein the step of updating is executed as frequently as the subject process transitions from one operating point to another.

13. A method as claimed in claim 8 wherein the step of using a non-linear model includes using a rigorous, first principles, non-linear model.

14. A method as claimed in claim 8 wherein the subject process is a polymer process.

* * * * *